(12) United States Patent
Florence (10) Patent No.: US 11,925,138 B2
(45) Date of Patent: Mar. 12, 2024

(54) BEET SCALPER

(71) Applicant: Andrew Florence, McCall, ID (US)

(72) Inventor: Andrew Florence, McCall, ID (US)

( * ) Notice: Subject to any disclaimer, the term of this patent is extended or adjusted under 35 U.S.C. 154(b) by 412 days.

(21) Appl. No.: 17/244,740

(22) Filed: Apr. 29, 2021

(65) Prior Publication Data

US 2022/0346308 A1 Nov. 3, 2022

(51) Int. Cl.
*A01D 33/14* (2006.01)
*A01D 23/02* (2006.01)

(52) U.S. Cl.
CPC ............ *A01D 33/14* (2013.01); *A01D 23/02* (2013.01); *A01D 2023/026* (2013.01)

(58) Field of Classification Search
CPC ........ A01D 13/00; A01D 23/00–23/06; A01D 25/00–25/048; A01D 27/00–27/04; A01D 33/00–33/14; A01B 61/00–61/048; A01B 63/00–63/32
See application file for complete search history.

(56) References Cited

U.S. PATENT DOCUMENTS

| | | | |
|---|---|---|---|
| 1,067,589 A * | 7/1913 | Dawson | A01B 39/18 172/705 |
| 2,247,293 A | 6/1941 | Flintjer | |
| 2,662,361 A * | 12/1953 | Botimer | A01D 23/02 56/121.46 |
| 2,679,792 A * | 6/1954 | Sheppard | A01B 35/22 172/268 |
| 2,759,318 A | 8/1956 | Oppel | |
| 2,788,731 A * | 4/1957 | Lindgren | A01B 13/08 172/698 |
| 2,852,902 A | 9/1958 | Oppel | |
| 3,032,122 A * | 5/1962 | Geurts | A01B 61/04 172/260.5 |
| 2,834,176 A | 5/1968 | Howell | |
| 3,423,914 A | 1/1969 | Itami | |

(Continued)

FOREIGN PATENT DOCUMENTS

| | | | | |
|---|---|---|---|---|
| DE | 102006008331 B4 * | 2/2008 | ......... | A01B 63/1115 |
| GB | 2264619 | 8/1993 | | |

(Continued)

OTHER PUBLICATIONS

Agrifac, Light Traxx, Product Brochure, undated (https://www.agrifac.com/beet-harvesters/lighttraxx/) (accessed at least as searly as May 21, 2021), Agrifac Machinery B.V., Netherlands.

(Continued)

*Primary Examiner* — Thomas B Will
*Assistant Examiner* — Madeline I Runco
(74) *Attorney, Agent, or Firm* — Progress Patent Law, PLLC; David R. McKinney (57) ABSTRACT

A beet scalper includes an upwardly biased parallel arm linkage, a boom, having an upper end coupled to the parallel arm linkage and a lower end bearing a beet scalping blade, and a locking mechanism, holding the boom in a downward operating position. Forward deflection of the lower end of the boom releases the locking mechanism, allowing the boom to rise to a tripped position under force of a biasing mechanism associated with the parallel arm linkage.

18 Claims, 6 Drawing Sheets

(56) References Cited

U.S. PATENT DOCUMENTS

| | | | | |
|---|---|---|---|---|
| 3,439,748 | A | * | 4/1969 | Ward .................. A01B 61/044 |
| | | | | 172/264 |
| 3,583,136 | A | | 6/1971 | Eisenhardt et al. |
| 3,871,161 | A | | 3/1975 | Eisenhardt |
| 4,036,305 | A | * | 7/1977 | Kinzenbaw .......... A01B 69/006 |
| | | | | 172/647 |
| 4,064,681 | A | * | 12/1977 | Glifberg ................ A01D 33/04 |
| | | | | 56/121.45 |
| 4,137,973 | A | | 2/1979 | Schwitters |
| 4,141,201 | A | | 2/1979 | Christensen |
| 4,185,696 | A | | 1/1980 | Williams et al. |
| 4,200,157 | A | * | 4/1980 | Anderson ............ A01B 61/046 |
| | | | | 172/705 |
| 5,398,771 | A | * | 3/1995 | Hornung ................ A01C 7/203 |
| | | | | 172/635 |
| 5,479,764 | A | | 1/1996 | Crummy et al. |
| 5,957,216 | A | | 9/1999 | Redekop |
| 6,397,952 | B1 | | 6/2002 | Hundeby |
| 8,910,724 | B2 | | 12/2014 | Borgmann et al. |
| 10,356,973 | B2 | * | 7/2019 | Paulessen .............. A01B 63/24 |
| 10,362,729 | B2 | | 7/2019 | Ramsauer et al. |
| 2017/0086360 | A1 | * | 3/2017 | Garner .................. A01C 5/068 |

FOREIGN PATENT DOCUMENTS

| | | | | |
|---|---|---|---|---|
| KR | 200347642 | Y1 | * | 4/2004 |
| KR | 100601585 | | | 7/2006 |
| KR | 20130093386 | A | * | 8/2013 |
| KR | 20150063191 | A | * | 6/2015 |
| KR | 20190122416 | A | * | 10/2019 |
| KR | 102048338 | B1 | * | 11/2019 |

OTHER PUBLICATIONS

Alloway, RDS S-Series Rigid Sugarbeet Defoliator, Product Brochure, undated (https://allowayag.com/rds-s-series-rigid-suigar-beet-defoliator/) (accessed at least as early as May 21, 2021), Alloway/Standard Industries, Inc., Fargo, ND, US.

* cited by examiner

FIG. 12 ately raise the boom from the downward operating position to a first tripped position.

BEET SCALPER

BACKGROUND

Field of the Invention

The present disclosure relates to agricultural equipment. In particular, this disclosure relates to mechanisms for scalping the tops of sugar beets before harvesting.

Related Art

Prior to harvesting sugar beets, a defoliator device is typically pulled through the field to chop the foliage or "greens" from the tops of the beets. This makes it easier to harvest the beets. It has also been found that sugar beets store better and retain better quality if the beet tops are "scalped" after defoliating and before harvesting. Scalping removes a silver dollar-sized portion of the top of the beet itself, right around the stem of the greens.

To scalp the beets, a series of scalpers can be attached to the rear end of a defoliator device or other towable agricultural implement. Each scalper typically includes a generally vertical member or boom having a blade at its bottom end. The scalper rides along a given row of beet tops as the defoliator is pulled through the field, and the blade scalps each beet as the device passes over. With a scalper of this general sort, if a backwards force is applied to the scalper assembly, such as due to the tractor reversing direction, the scalper booms and/or the defoliator can be damaged.

SUMMARY

It has been recognized that it would be advantageous to have a sugar beet scalper device that is resistant to damage from reverse motion of the scalper device and which is simple in its operation and configuration.

In accordance with one embodiment thereof, the present invention provides a beet scalper, comprising an upwardly biased parallel arm linkage; a boom, having an upper end coupled to the parallel arm linkage and a lower end bearing a beet scalping blade; and a locking mechanism, holding the boom in a downward operating position. Forward deflection of the lower end of the boom releases the locking mechanism, allowing the boom to rise to a tripped position under force of a biasing mechanism associated with the parallel arm linkage.

In accordance with another aspect thereof, the invention provides a sugar beet scalper, comprising a scalping boom, having an upper end and a lower end bearing a beet scalping blade; a lifting mechanism, coupled to the upper end; and a locking mechanism, holding the boom in a downward operating position. Forward deflection of the lower end of the boom releases the locking mechanism, allowing the lifting mechanism to automatically raise the boom from the downward operating position to a first tripped position.

In accordance with yet another aspect thereof, the invention provides a sugar beet defoliator with scalping attachments, comprising a defoliator unit, moveable in a field in an operating direction, configured to remove foliage from beet tops; and a plurality of beet scalpers, disposed at a row-width spacing in discrete groups on a rear portion of the defoliator. Each beet scalper includes an upwardly spring-biased parallel arm linkage; a scalping boom, having a lower portion supporting a beet scalping blade, and an upper portion attached to the parallel arm linkage; and a locking mechanism, interconnected between the boom and the parallel arm linkage. The locking mechanism is configured to secure the boom in a downward operating position against the bias of the parallel arm linkage, and to release the boom to lift away from the operating position to a tripped position under force of the parallel arm linkage when a force opposite to the operating direction is applied upon the lower portion of the boom, causing the upper portion of the boom to rearwardly deflect an actuation amount.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein.

DETAILED DESCRIPTION

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 1:
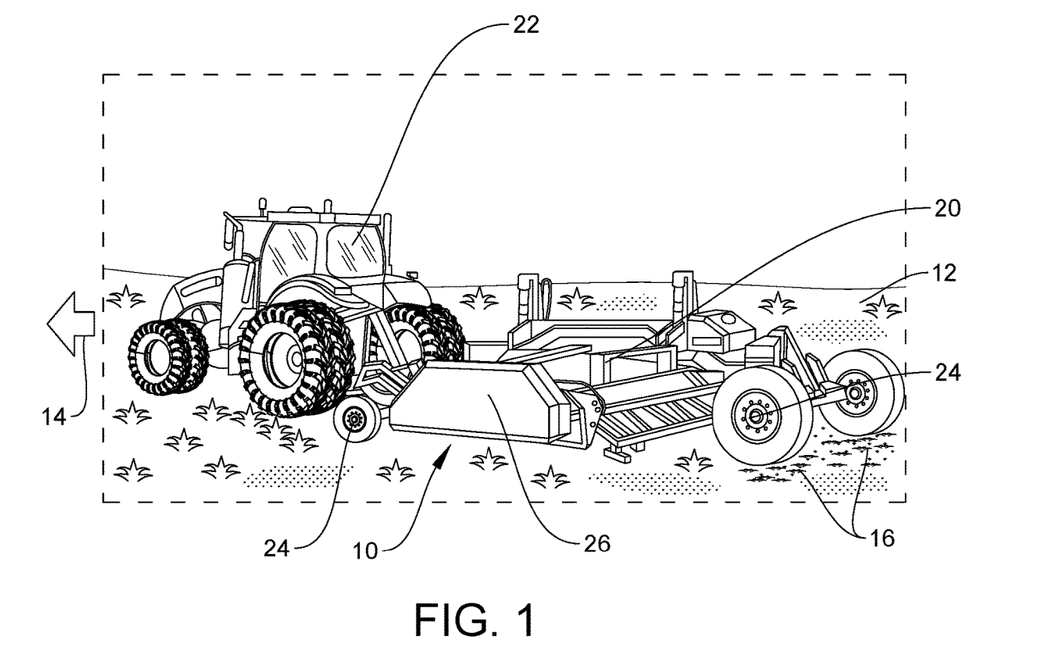
FIG. 1 is a perspective view of a defoliator device, having a series of beet scalpers attached thereto, operating in a field of sugar beets.

As noted above, prior to harvesting sugar beets, a defoliator is typically pulled through the field to chop the greens from the tops of the beets. Shown in FIG. 1 is a perspective view of a sugar beet defoliator unit 10 that is being pulled in a field 12 in an operating direction 14, to remove foliage or "greens" 16 from the tops of beets (18 in FIG. 5). The defoliator 10 generally includes a frame 20 that is connectable to a towing vehicle 22, such as a tractor, for pulling in the field 12. The frame 20 includes wheels 24 for supporting the device on the ground, and supports a defoliator body 26 that includes and contains moveable blades (not shown) for cutting the beet greens 16. Cutting the greens 16 from the tops of the beets 18 makes it easier to harvest the beets 18.

Figure 5:
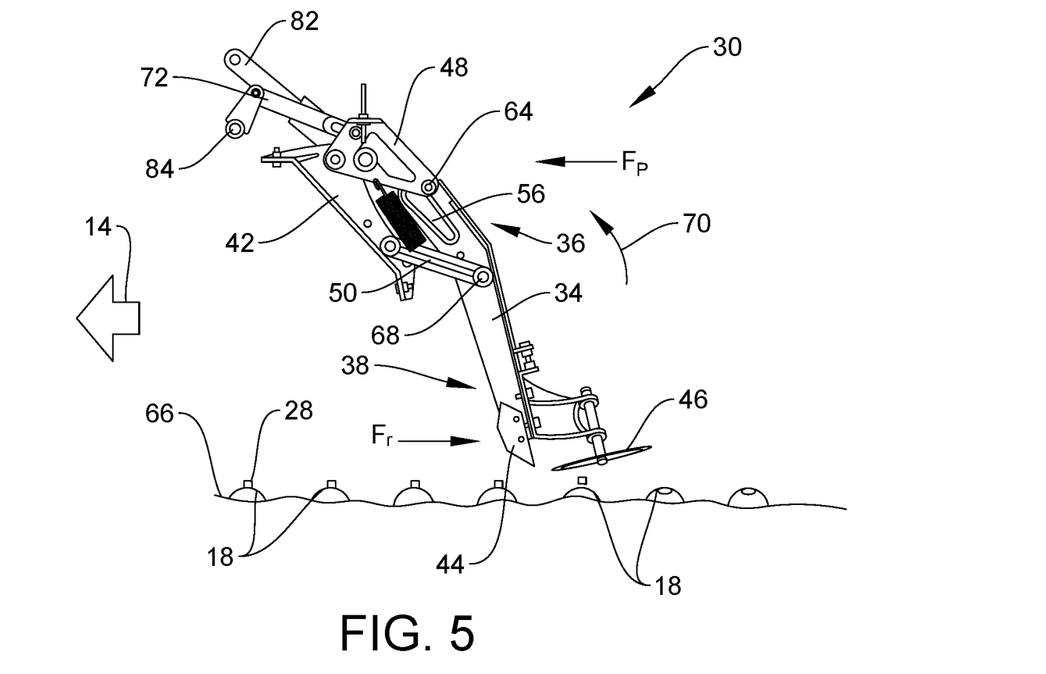
FIG. 5 is a side view of a beet scalper configured in accordance with the present disclosure, with the scalper boom in the downward operational position.

To help the beets 18 store well and retain high quality, it is desirable that the tops of the beets 18 be "scalped" after defoliating, to remove an approximately silver dollar-sized portion (e.g. about 1.5"-2" diameter) of the top of the beet 18, right around the base of the stem (28 in FIG. 5). Beet scalping systems have been developed to perform this function. Unfortunately, prior beet scalper systems that can perform this function can be damaged if a backward force is applied to the individual scalper assemblies, such as due to the scalping vehicle reversing direction when maneuvering in the field.

Figure 2:
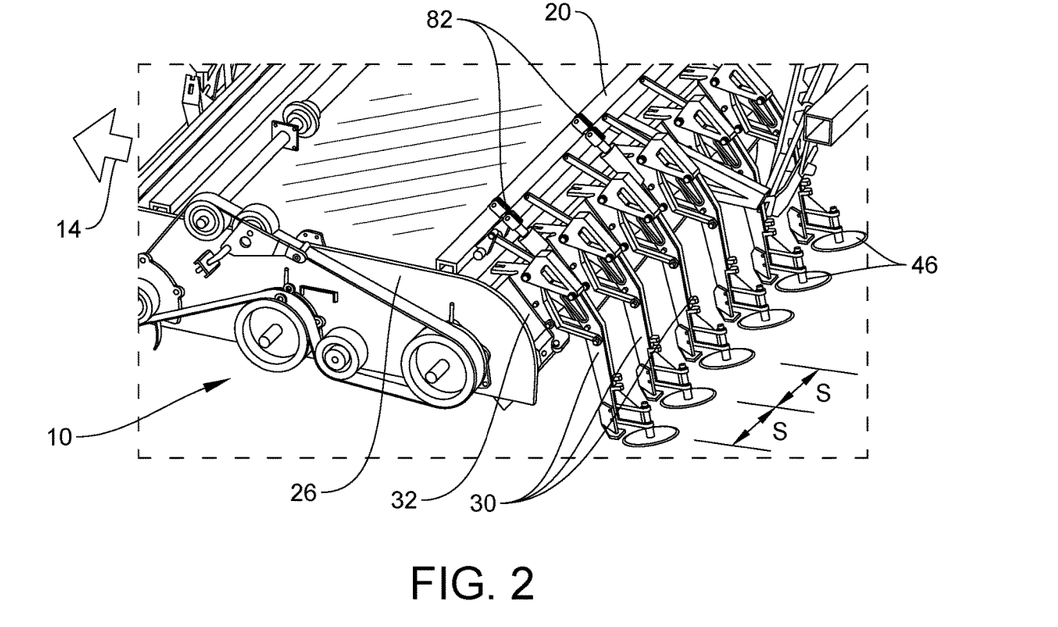
FIG. 2 is an upper perspective view of the rear portion of the beet defoliator device of FIG. 1, showing an array of beet scalpers attached to the rear of the defoliator.

Advantageously, the present disclosure provides a beet scalper system having an automatic lifting and retracting mechanism for individual scalper booms, which addresses this concern. Shown in FIG. 2 is a view of rear portion of a defoliator device 10 that includes a series of beet scalper assemblies 30 having an automatic lifting and retracting mechanism configured in accordance with the present disclosure. The scalper assemblies 30 are attached to the rear deck or frame 32 of a defoliator 10 at a row-width spacing S. While a defoliator 10 is illustrated, it is to be understood that the beet scalper assemblies 30 can be mounted upon other types of towable agricultural implements.

Figure 3:
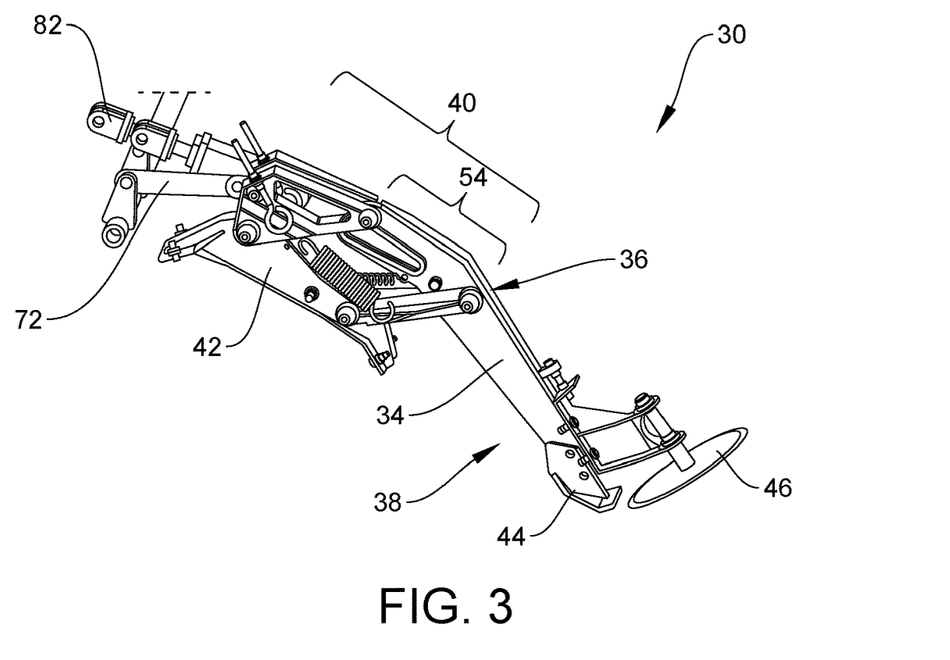
FIG. 3 is a side view of a beet scalper configured in accordance with the present disclosure.
Figure 4:
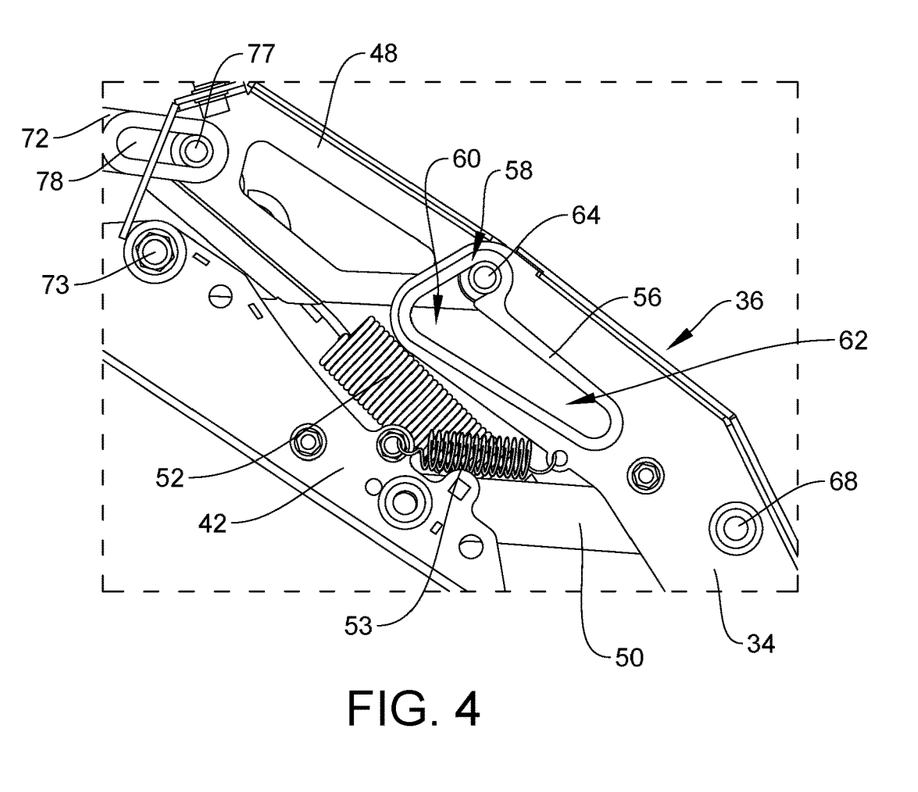
FIG. 4 is a close-up view of the locking mechanism of the beet scalper of FIG. 3.

Referring to FIGS. 3 and 4, each beet scalper 30 includes a generally vertical or upright scalper boom 34, which has an upper portion 36 and a lower portion 38. The upper portion 36 of the scalper boom 34 is attached to an automatic lifting mechanism, indicated generally at 40, which in turn is attached to the towable agricultural implement 10 via a mount 42. A skid plate 44 and cutting blade 46 are disposed at the lower or distal end of the boom 34. The skid plate 44 allows the bottom end of the boom 34 to ride along the tops of the beets (18 in FIGS. 1, 5) in a given row, while the blade 46 scalps each beet as the scalping system moves through the field in the operating direction 14 over the rows of crops. The scalper blades 46 can be fixed or moveable, and can be circular or other shape. Though not depicted herein, the scalping blades 46 can also be powered, such as rotary powered, to facilitate scalping the beet tops.

The automatic lifting mechanism 40 can be configured in a variety of ways. In the embodiment shown herein, the lifting mechanism 40 is an upwardly spring-biased parallel arm linkage. The parallel arm linkage includes an upper arm 48 and a lower arm 50 that are pivotally connected between the upper portion 36 of the boom 34 and the mount 42, with a biasing mechanism interconnected therebetween. Specifically, a lifting spring 52 is coupled between the upper arm 48 and the lower arm 50, and a locking spring 53 is attached between the mount 42 and the upper portion 36 of the boom 34. The lifting spring 52 provides a biasing force between the arms 48, 50 of the parallel arm linkage, and the locking spring 53 provides a biasing force between the upper portion 36 of the boom 34 and the mount 42 of the scalper assembly 30. The lifting spring 52 and the locking spring 53 are both tension springs. When the boom 34 is not blocked from doing so, the combined biasing force of the lifting spring 52 and the locking spring 53 is sufficient to raise the upper portion 36 of the boom 34 and simultaneously pull the lower arm 50 relative to the upper arm 48, and thus raise (i.e. translate and rotate) the boom 34 from the lowered, operating position (shown in FIG. 5), to a tripped position (shown in FIG. 9), as described in more detail below.

The beet scalper 30 disclosed herein also includes a locking mechanism, indicated generally at 54, which works in concert with the lifting mechanism 40. The locking mechanism 54 depicted herein is interconnected between the upper portion 36 of the boom 34 and the parallel arm linkage, and can be considered to be part of the lifting mechanism 40. The locking mechanism 54 is configured to secure the boom 34 in a downward operating position (shown in FIG. 5) against the bias of the parallel arm linkage, and to release the boom 34 to lift away from the operating position under force of the parallel arm linkage when a force opposite to the operating direction 14 is applied upon the lower portion 38 of the boom 34.

With reference to FIG. 4, the locking mechanism 54 includes a locking slot 56, attached to the upper end of the boom 34. The locking slot 56 has an inverted "L" shape, with an upper or locking portion 58 rearwardly extending from the apex 60 of the slot 56, and a lifting portion 62 downwardly extending from the apex 60. A locking pin 64 is attached to the parallel arm linkage and slidingly disposed in the locking slot 56. The locking pin 64 rests in the upper or locking portion 58 of the slot 56 to hold the boom 34 in the downward operating position when the beet scalper 30 is in normal use. The locking spring 53 is also a component of the locking mechanism 54. When within the locking portion 58, the locking pin 64 is in a locked position. In this position, the biasing force of both the lifting spring 52 and the locking spring 53 tends to hold the locking pin 64 at the end of the locking portion 58 of the slot 56, and resist the pin 64 moving toward the apex 60 of the locking slot 56, generally in the manner of an over-center spring device.

Figure 6:
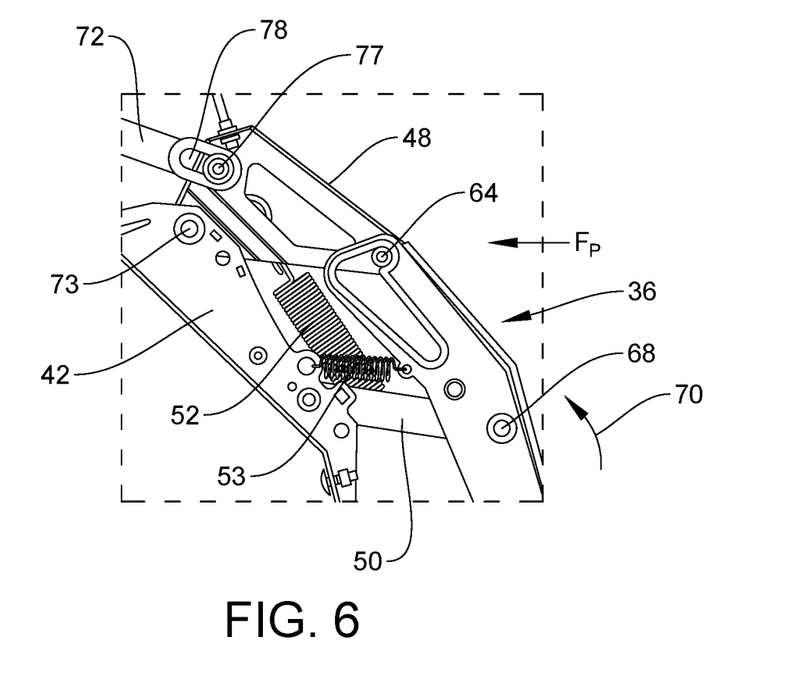
FIG. 6 is a close-up view of the locking mechanism of the beet scalper of FIG. 5, showing the locking mechanism locked in the operational position.

Additional details of the lifting mechanism 40 and the locking mechanism 54 are shown in the successive views of FIGS. 5-12. Shown in FIG. 5 is a side view of the beet scalper 30 with the scalper boom 34 in the downward operational position, and FIG. 6 provides a close-up view of the locking mechanism 54 of the beet scalper 30 in this position. When in the downward operating position, contact of the distal end of the lower portion 38 of the boom 34 with the ground 66 and with tops of beets 18 and other obstacles during forward movement of the agricultural implement will tend to impose a rearward force $F_r$ on the distal end of the lower portion 38 of the boom 34, tending to cause rearward deflection of the distal end of the boom 34. As can be seen from the figures, the boom 34 is pivotally connected to the lower arm 50 of the parallel arm linkage at a lower pivot point 68 that is below the locking slot 56. Accordingly, the rearward force $F_r$ on the distal end of the boom 34 will tend to cause counterclockwise rotation or torque, indicated by arrow 70, of the boom 34 about this lower pivot point 68, thus producing a forward force $F_p$ upon the upper portion 36 of the boom 34, which will provide additional force holding the locking pin 64 within the end of the locking portion 58 of the locking slot 56.

The upper arm 48 of the parallel arm linkage is also attached to a lifting bar 72 via a lifting pin 77 that is located above the upper pivot point 73 of the upper arm 48. The distal end of the lifting bar 72 includes an elongate slot 78, in which the lifting pin 77 is located. The slot 78 allows the lifting pin 77 to slide a small distance to accommodate and absorb modest bumps and jolts of the boom 34 during operation. With the pin 64 in the locked position, a forward force $F_p$ that is applied against locking pin 64 will tend to cause counter-clockwise rotation of the upper arm 48. The lifting bar 72 is configured to resist these forces while also allowing small deflections of the upper arm 48 while keeping the locking pin 64 in the locked position, thus allowing controlled rearward deflection of the lower portion 38 of the boom 34 as the lower portion 38 rides over the tops of beets 18 during normal use in the operating direction 14.

Figure 7:
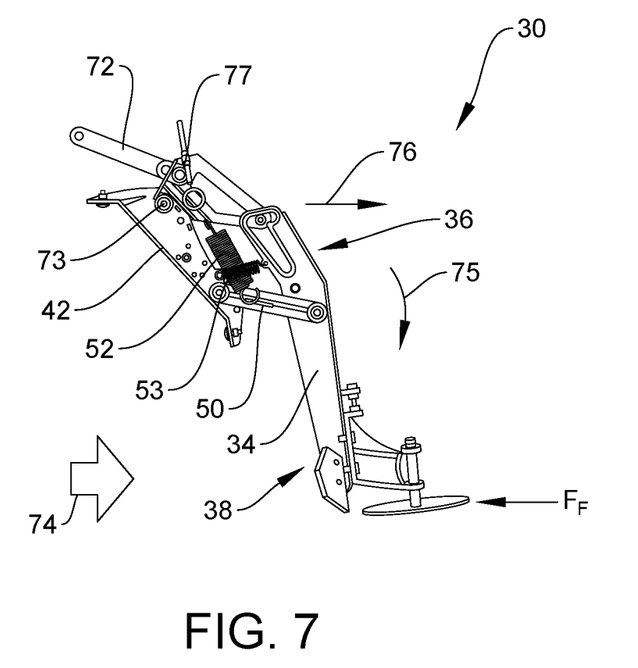
FIG. 7 is a side view of a beet scalper configured in accordance with the present disclosure, with the scalper boom subject to a reverse or forward force and initially tripped.
Figure 8:
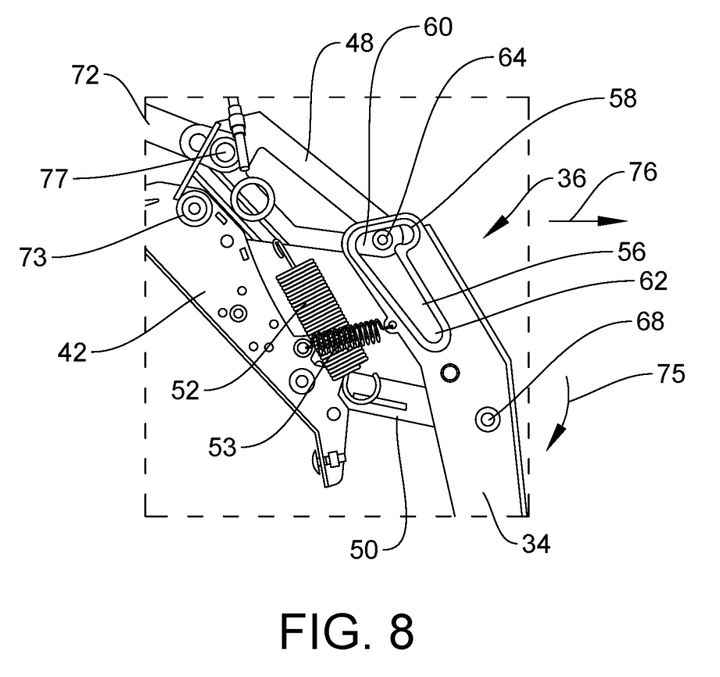
FIG. 8 is a close-up view of the locking mechanism of the beet scalper of FIG. 7, shifted to an initial tripping position.

On the other hand, the beet scalper 30 disclosed herein is configured to release or "trip" from the downward locked position when a forwardly directed force acts against the lower end 38 of the boom 34. This function is illustrated beginning in FIGS. 7 and 8. Shown in FIG. 7 is a side view of the beet scalper 30 with the scalper boom 34 in the downward position, subject to a forward force $F_f$ and initially tripped, and the view of FIG. 8 provides a close-up of the locking mechanism 54 in this condition. When the lower portion 38 of the boom 34 is subject to a forward force $F_f$, such as can occur when the agricultural implement moves in a reverse direction, indicated by arrow 74, the locking mechanism 54 can be shifted to an initial tripping position, as shown in these figures.

As noted above, the boom 34 is pivotally connected to the lower arm 50 of the parallel arm linkage at a lower pivot point 68 that is below the locking slot 56. Accordingly, the forward force $F_f$ on the distal end of the boom 34 will tend to forwardly deflect the lower portion 38 of the boom 34 and cause clockwise rotation or torque, indicated by arrow 75, of the boom 34 about this lower pivot point 68, thus producing rearward motion of the upper end of the boom 34, indicated by arrow 76. When this force $F_f$ is sufficient to overcome the over-center force of the lifting spring 52 and the locking spring 53, the rearward motion of the upper portion 36 of the boom 34 will cause the locking pin 64 to slide from the locking portion 58 toward the apex 60 of the locking slot 56. This motion will release or "trip" the locking mechanism 54, allowing the boom 34 to rise under force of the lifting spring 52 on the parallel arm linkage and the force of the locking spring 53 on the upper portion 36 of the boom 34 to the tripped position shown in FIGS. 9 and 10.

Stated differently, forward deflection of the lower end of the boom 34 as a result of force $F_f$ will tend to move or rotate the locking slot 56 such that the locking pin 64 will shift from the locked position (at the end of the locking portion 58) to the released position (at the apex 60), as shown in FIGS. 7 and 8. Advantageously, the locking pin 64 provides minimal resistance to upward movement of the parallel arm linkage when at the apex 60 or in the lifting portion 62. Consequently, when the forward force $F_f$ is applied upon the lower end 38 of the boom 34—that is, a force sufficient to cause the locking slot 56 to rotate and move or shift the locking pin 64 from the upper or locking portion 58 of the locking slot 56 toward the apex 60 of the locking slot 56—the locking mechanism 54 will release.

Those of skill in the art will recognize that the magnitude of the force $F_f$ and of the deflection of the boom 34 that is sufficient to release the locking mechanism 54 will depend upon the geometry of the locking mechanism 54, the lifting mechanism 40 and the boom 34, as well as frictional forces between the various components, the strength of the lifting and locking springs 52 and 53, and other factors. Forward deflection of the lower end 38 of the boom 34 rotates the boom 34 clockwise about the lower pivot point 68, as indicated by arrow 75, which will rearwardly deflect the locking slot 56, as indicated by arrow 76. When the locking slot 56 is deflected by an amount that is approximately equal to a length of the locking portion 58, the locking pin 64 moves to the apex 60 and into the lifting portion 62 of the locking slot 56, such that the locking mechanism 54 is released and the boom 34 can rise. This length, the distance that the locking pin 64 moves within the locking portion 58 of the locking slot 56 to travel to the apex 60, and the magnitude of force and deflection of the boom 34 that allows this movement, is referred to herein as the actuation amount.

Figure 9:
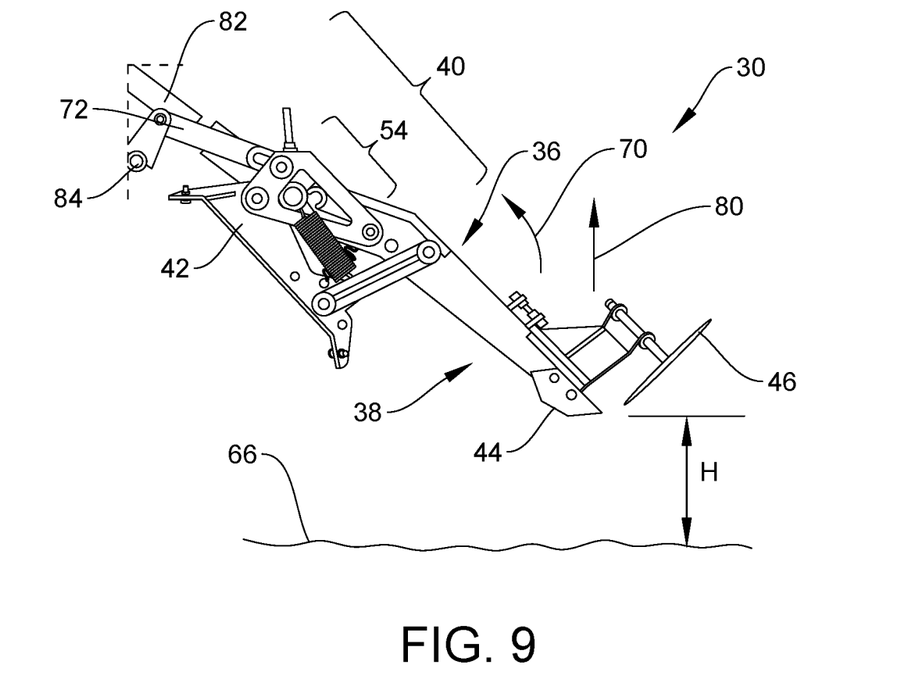
FIG. 9 is a side view of a beet scalper configured in accordance with the present disclosure, with the scalper boom raised to the lifted position.
Figure 10:
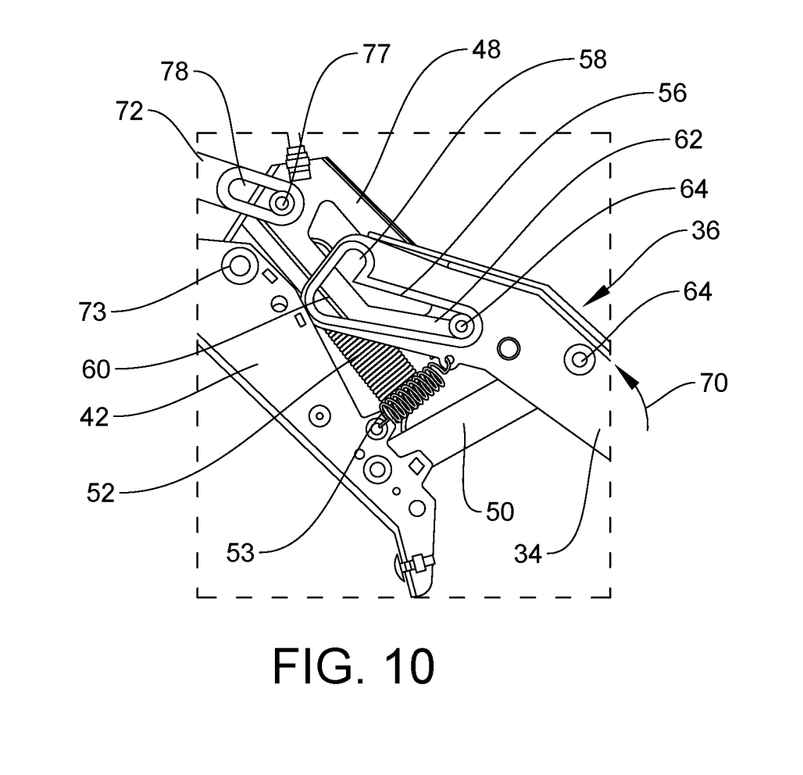
FIG. 10 is a close-up view of the locking mechanism of the beet scalper of FIG. 9, shifted to the raised position.

Once the locking mechanism 54 is released in this way, the locking pin 64 will slide downward to a released position in the lifting portion 62 of the locking slot 56. This allows the boom 34 to rise under the force of the lifting spring 52 and the locking spring 53. Shown in FIG. 9 is a side view of the beet scalper 30 with the scalper boom 34 raised to the lifted position, and FIG. 10 provides a close-up view of the locking mechanism 54 of the beet scalper 30 in this position. When tripped, the boom 34 rotates further in the counter-clockwise direction, as indicated by arrow 70, and the lower end 38 of the boom 34 rises to a lifted position some distance H above the ground 66, as indicated by arrow 80 in FIG. 9. This lifting and additional rotating action allows the lower end 38 of the boom 34 to rise away from the contacted object(s) to avoid damage, so that rearward motion (in direction of arrow 74 in FIG. 7) of the agricultural implement 10 does not significantly damage the scalper 30. The height H of the lifted or raised position can be any desired amount, such as at least about 1 foot above the ground 66 or above the operating position. Tripping and rising of the scalper boom(s) 34 can be easily noticed by an operator because of the motion of the boom(s) 34 and mechanical sounds that are likely to accompany this release.

Figure 11:
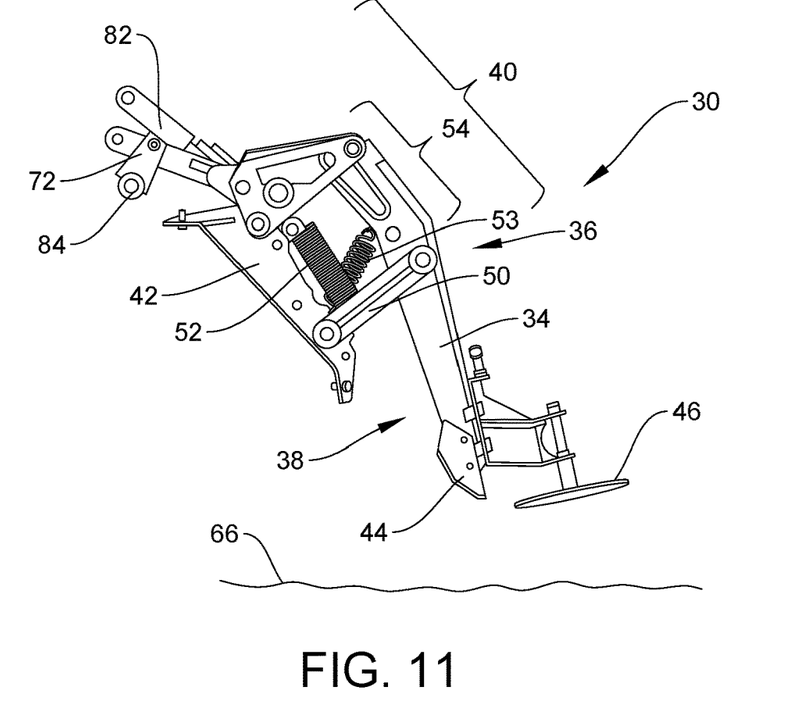
FIG. 11 is a side view of a beet scalper configured in accordance with the present disclosure, with the scalper boom raised and rotated to the reset position.
Figure 12:
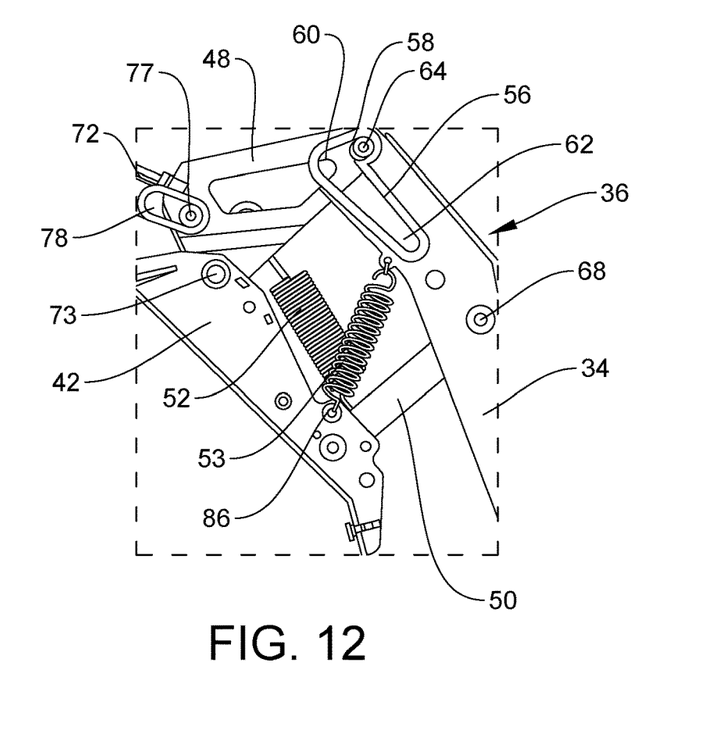
FIG. 12 is a close-up view of the locking mechanism of the beet scalper of FIG. 11, shifted to the reset position.

It will be noted that in the tripped position of FIGS. 9 and 10 the upper arm 48 of the parallel arm linkage remains in substantially the same position and orientation as during normal operation of the beet scalper 30, though it will tend to drop down as the lifting pin 77 slides to the bottom of the slot 78. After the boom 34 is tripped and rises to the lifted position shown in FIG. 9, it can subsequently be shifted to a second raised or reset position, as shown in FIGS. 11 and 12. As seen in FIG. 2, each of several discrete groups of scalper assemblies 30 are associated with a hydraulic lifting cylinder 82. As can be seen in FIGS. 3, 5, 7, 9 and 11, the hydraulic cylinder 82 is connected to the lifting pin 77 on the upper arm 48 of the parallel arm linkage, which is also the connection point of the distal end of the lifting bar 72. The opposite or proximal end of the lifting bar 72 is connected, via a pinned linkage, to a pivoting shaft 84. After any one boom 34 in a discrete group of scalper assemblies 30 is tripped, the operator can raise all of the scalper booms 34 in that discrete group by retracting the associated hydraulic cylinder 82. Because all of the scalper assemblies 30 in each discrete group are connected to the pivoting shaft 84 via their respective lifting bars 72, raising the one scalper assembly 30 to which the hydraulic cylinder 82 is connected will raise all scalper assemblies in the discrete group via their respective lifting bars 72.

As shown in FIGS. 11 and 12, this action will rotate the upper arm 48 of the parallel arm linkage counter-clockwise, causing the locking pin 64 to slide back into the locking portion 58 of the locking slot 56, and the boom 34 to rotate, as indicated by arrow 80, to a more vertical orientation, though still above the ground 66. Viewing FIG. 12, an upper limit for the raised position is provided by a mechanical stop 86, disposed on the mount 42 and positioned to contact the lower arm 50 of the parallel arm linkage at a desired maximum point of rotation. From the position shown in FIGS. 11 and 12, the user can lower and reset the booms 34 of all scalper assemblies in the raised group to the operating position by re-extending the hydraulic cylinder 82 and returning the booms 34 to their lower operating positions, pushing the booms 34 downward against the force of the biasing springs 52 and 53, returning the scalper assembly 30 back to the operating position shown in FIG. 5, with the locking pin 64 in the locked position.

The disclosure thus presents a beet scalper 30 having an automatic, spring-loaded retracting mechanism 40, with a locking mechanism 54 that is triggered or "tripped" by contact with an obstacle. Reverse direction contact with the ground 66 or other obstacle will release or "trip" the locking mechanism 54, allowing the scalper boom 34 to automatically retract upwardly, so as to reduce the likelihood of damage from this contact. Advantageously, the scalper mechanism 30 can then be easily reset by a user, and operation can resume.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A beet scalper, comprising:
   an upwardly biased parallel arm linkage, coupleable to a rear portion of a towable agricultural implement;
   a boom, having an upper end coupled to the parallel arm linkage and a lower end bearing a beet scalping blade; and
   a locking mechanism, holding the boom in a downward operating position, forward deflection of the lower end of the boom releasing the locking mechanism, allowing the boom to rise to a tripped position under force of a biasing mechanism associated with the parallel arm linkage.

2. A beet scalper in accordance with claim 1, the locking mechanism further comprising:
   a locking slot, attached to the upper end of the boom, having a locking portion and a lifting portion; and
   a locking pin, attached to an upper arm of the parallel arm linkage and slidingly disposed in the locking slot, the locking pin resting in the locking portion of the slot to hold the boom in the downward operating position, forward deflection of the lower end of the boom moving the locking slot such that the locking pin shifts to the lifting portion, allowing the boom to rise.

3. A beet scalper in accordance with claim 2, wherein the locking slot has an inverted "L" shape with an apex, the locking portion rearwardly extending from the apex and the lifting portion downwardly extending from the apex, forward deflection of the lower end of the boom causing the locking slot to rotate and move the locking pin from the locking portion to the apex, the locking pin providing minimal resistance to upward movement of the parallel arm linkage when at the apex or in the lifting portion.

4. A beet scalper in accordance with claim 2, the boom being connected to a lower arm of the parallel arm linkage at a pivot point below the locking slot, forward deflection of the lower end of the boom rotating the boom about the pivot point to rearwardly deflect the locking slot by an actuation amount that is approximately equal to a length of the locking portion.

5. A beet scalper in accordance with claim 1, wherein the tripped position is at least about 1 foot above the operating position.

6. A beet scalper in accordance with claim 1, further comprising:
   an actuator, connected to an upper arm of the parallel arm linkage, configured to shift the boom from the tripped position to a reset position.

7. A beet scalper in accordance with claim 6, wherein the actuator is further configured to return the boom from the reset position to the operating position.

8. A beet scalper in accordance with claim 1, wherein:
   the parallel arm linkage includes an upper arm and a lower arm; and
   the biasing mechanism comprises a spring, coupled between the upper arm and the lower arm.

9. A beet scalper in accordance with claim 1, further comprising a skid plate, disposed forwardly of the scalping blade, configured to allow the lower portion of the boom to ride over beet tops.

10. A sugar beet scalper, comprising:
    a scalping boom, having an upper end, and a lower end bearing a beet scalping blade;
    a lifting mechanism, comprising an upwardly biased parallel arm linkage, coupled to the upper end; and
    a locking mechanism, holding the boom in a downward operating position, forward deflection of the lower end of the boom releasing the locking mechanism, allowing the lifting mechanism to automatically raise the boom from the downward operating position to a first tripped position.

11. A sugar beet scalper in accordance with claim 10, wherein the locking mechanism is interconnected between the boom and the parallel arm linkage, the locking mechanism further comprising:
    an inverted L-shaped locking slot, attached to the upper end of the boom, having a rearwardly oriented upper portion and a downwardly oriented portion; and
    a locking pin, attached to the parallel arm linkage and disposed in the locking slot, having a locked position within the upper portion, and a released position within the downwardly oriented portion, the parallel arm linkage configured to automatically raise the boom away from the operating position to the first tripped position when a forward force, sufficient to shift the locking pin from the upper portion of the locking slot to the downwardly oriented portion of the locking slot, is applied upon the lower end of the boom.

12. A sugar beet scalper in accordance with claim 10, wherein the first tripped position is at least about one foot above the downward operating position, the lifting mechanism further comprising a second reset position, in which the boom is above the tripped position, from which a user can reset the boom to the operating position.

13. A sugar beet scalper in accordance with claim 12, further comprising:
    a pivoting shaft, coupled to the upper end of the boom; and
    an actuator, coupled to the pivoting shaft, configured to rotate the pivoting shaft and thereby move the boom between the second reset position and the downward operating position.

14. A sugar beet defoliator with scalping attachments, comprising:
    a defoliator unit, moveable in a field in an operating direction, configured to remove foliage from beet tops; and
    a plurality of beet scalpers, disposed at a row-width spacing in discrete groups on a rear portion of the defoliator, each beet scalper including
        an upwardly spring-biased parallel arm linkage;
        a scalper boom, having a lower portion supporting a beet scalping blade, and an upper portion attached to the parallel arm linkage; and a locking mechanism, interconnected between the boom and the parallel arm linkage, configured to secure the boom in a downward operating position against the bias of the parallel arm linkage, and to release the boom to lift away from the operating position to a tripped position under force of the parallel arm linkage when a force opposite to the operating direction is applied upon the lower portion of the boom, causing the upper portion of the boom to rearwardly deflect an actuation amount.

15. A sugar beet defoliator in accordance with claim 14, wherein the locking mechanism further comprises:
   an inverted L-shaped locking slot, attached to the upper portion of the boom, having a rearwardly oriented upper portion and a downwardly oriented portion; and
   a locking pin, attached to the parallel arm linkage and disposed in the locking slot, having a locked position when within the upper portion, and a released position when within the downwardly oriented portion, the locking mechanism releasing when the force upon the lower portion of the boom is sufficient to shift the locking pin from the upper portion of the locking slot to the downwardly oriented portion of the locking slot.

16. A sugar beet defoliator in accordance with claim 15, wherein the actuation amount is substantially equal to a length of the rearwardly oriented upper portion of the locking slot.

17. A sugar beet defoliator in accordance with claim 14, wherein the tripped position is at least about one foot above the downward operating position, the parallel arm linkage being moveable to a reset position, in which the boom is above the tripped position, from which a user can reset the boom to the operating position.

18. A sugar beet defoliator in accordance with claim 17, further comprising:
   a pivoting shaft, coupled to the upper ends of all booms in a discrete group of beet scalpers; and
   an actuator, coupled to the pivoting shaft, configured to rotate the pivoting shaft and thereby move all booms of the discrete group between the reset position and the downward operating position.

\* \* \* \* \*